United States Patent [19]

Gutleber

[11] Patent Number: 4,500,883

[45] Date of Patent: Feb. 19, 1985

[54] ADAPTIVE MULTIPLE INTERFERENCE TRACKING AND CANCELLING ANTENNA

[75] Inventor: Frank S. Gutleber, Little Silver, N.J.

[73] Assignee: The United States of America as represented by the Secretary of the Army, Washington, D.C.

[21] Appl. No.: 472,793

[22] Filed: Mar. 7, 1983

[51] Int. Cl.[3] .......... G01S 3/06

[52] U.S. Cl. .......... 343/383; 343/380; 343/844

[58] Field of Search .......... 343/844, 853, 380, 383, 343/423, 426, 428, 430, 374

[56] References Cited

U.S. PATENT DOCUMENTS

| | | | |
|---|---|---|---|
| 3,130,410 | 4/1964 | Gutleber | 343/844 |
| 4,097,866 | 6/1978 | Frost et al. | 343/380 |
| 4,268,829 | 5/1981 | Baurle et al. | 343/380 |

*Primary Examiner*—Eli Lieberman

*Assistant Examiner*—Michael C. Wimer

*Attorney, Agent, or Firm*—Anthony T. Lane; Michael Zelenka; Jeremiah G. Murray

[57] ABSTRACT

An array antenna comprised of n individual elements where n is an integer power of the base two. The individual elements have predetermined space code positions N which are varied by means of a plurality of tracking loops comprised of a portion of receiver apparatus coupled to the array and a null seeking detector which is adapted to vary the space code positions of the elements such that the elements are selectively spaced at respective N' locations relative to the N locations to provide a predetermined 180° phase difference between sets of elements operating in pairs at each space angle of arrival of each of M interference signals whereby a null and substantially complete cancellation of the interfering sources are simultaneously provided while retaining the ability to receive the desired signal at its peak received value.

25 Claims, 5 Drawing Figures

FIG. 1
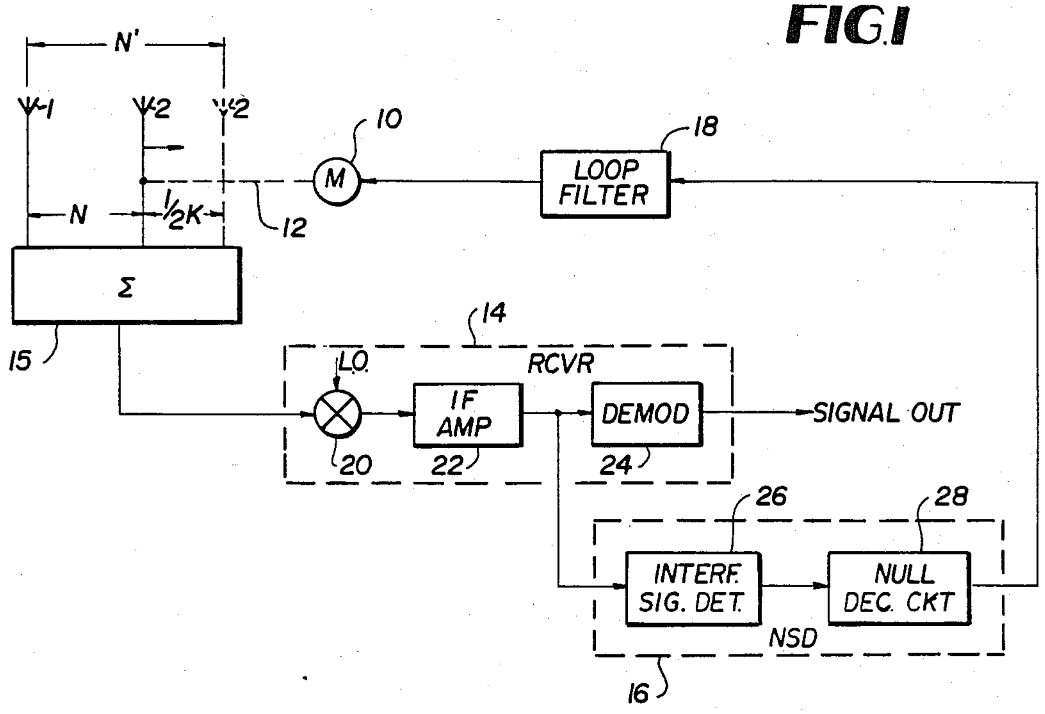
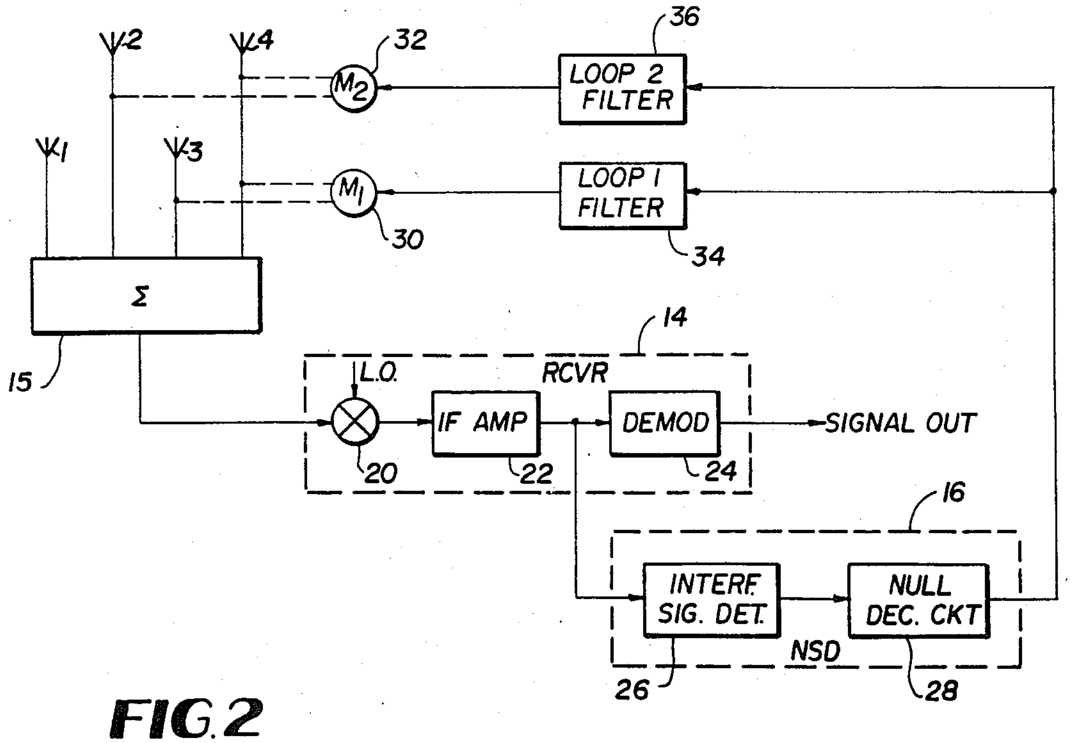
FIG. 2

FIG. 3
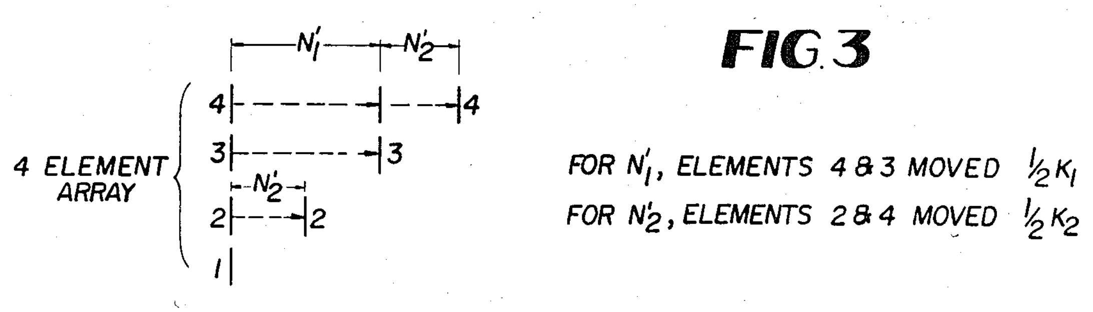
FIG. 4
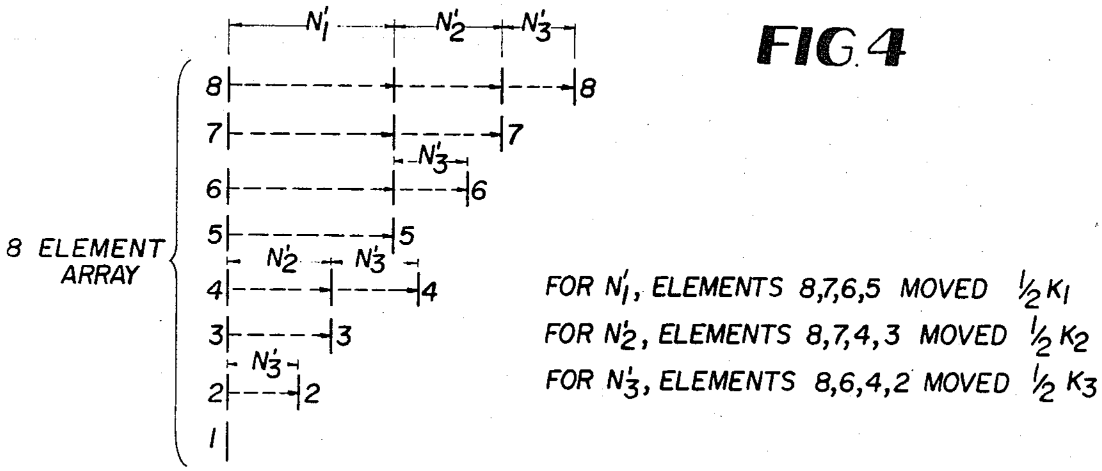
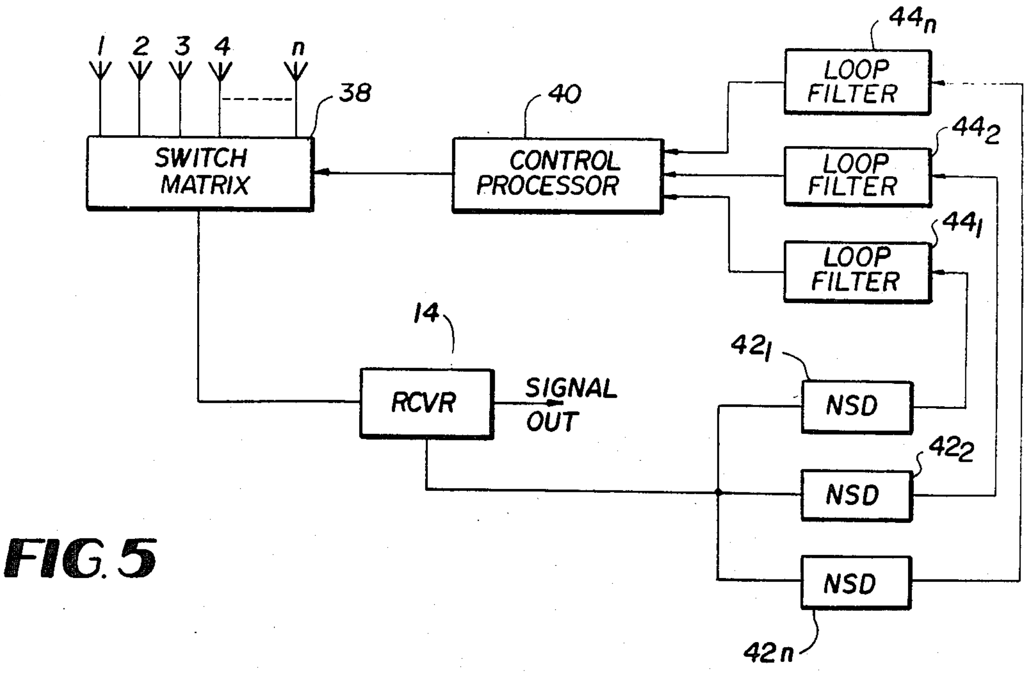
FIG. 5

ADAPTIVE MULTIPLE INTERFERENCE TRACKING AND CANCELLING ANTENNA

The invention described herein may be manufactured and used by or for the Government for governmental purposes without the payment of any royalties thereon or therefor.

FIELD OF THE INVENTION

This invention relates generally to antenna systems for radio communications apparatus and more particularly to an antenna system therefor which is adapted to independently track and cancel interference from multiple undesired signal sources.

BACKGROUND OF THE INVENTION

Array antennas of a variety of types are well known in the prior art. One known array antenna discloses the concept of spacing a particular number of individual antenna elements relative to one another for controlling the null positions of the desired antenna pattern. More particularly, such an antenna has been disclosed in U.S. Pat. No. 3,130,410, entitled, "Space Coded Linear Array Antenna", issued to Frank S. Gutleber, the subject inventor, on April 21, 1964. This patent is illustrative of array antennas which involve positioning a second element for each existing element in a space position that results in a 180° phase difference between each pair of elements for some specific value of space angle $\theta$ where radiation is transmitted or received. Controlling element spacing has shown to result in simpler and more flexible implementation and control of the array while simultaneously providing enhanced performance over systems which utilize techniques which change the phase and/or amplitude of the individual array elements. The teachings of this U.S. Pat. No. 3,130,410 form a basis for the present invention and provide a basic understanding of the underlying principles governing the operation of this type of antenna and accordingly is hereby specifically incorporated by reference.

SUMMARY

Therefore, it is an object of the present invention to provide an array antenna which adaptively tracks and simultaneously cancels interference from undesired multiple sources.

It is another object of the present invention to provide an array antenna which can not only adaptively track and simultaneously cancel interference from jammers, but also from friendly sources using the same frequency bands.

It is yet another object of the present invention to provide an array antenna whereby a number of separate stationary or mobile interfering sources can be independently tracked and nulled while retaining any desired signal at its peak received level.

It is still yet another object of the invention to provide an array antenna which is able to eliminate interference that is relatively close to the angular direction of arrival of the desired signal while automatically accommodating grating lobe control.

It is still a further object of the invention to provide an array antenna capable of tracking a plurality of independent moving interferers in angular space with infinite nulls while simultaneously retaining the desired signal at its received value.

Briefly, these and other objects are accomplished by means of an array antenna comprised of n individual elements, where n is an integer power of the base two. The individual elements have predetermined space code positions N which are adaptively varied by means of null tracking loops which are operable to vary the code positions such that a plurality of the n elements are spaced to provide a predetermined 180° phase difference between sets of elements operating in pairs at the space angle of the arrival of each interference signal whereby a null and substantially complete cancellation of the interfering source is provided while retaining the ability to receive a desired signal at its peak received value.

BRIEF DESCRIPTION OF THE DRAWINGS

FIG. 1 is a functional block diagram illustrative of a two element array in accordance with the subject invention;

FIG. 2 is a functional block diagram illustrative of a four element array in accordance with the subject invention;

FIG. 3 is a schematic diagram illustrative of the operation of the array antenna shown in FIG. 2;

FIG. 4 is a schematic diagram illustrative of the operation of an eight element array in accordance with the subject invention; and FIG. 5 is a functional block diagram illustrative of an alternate embodiment for controlling an n element array in accordance with the subject invention.

DESCRIPTION OF THE PREFERRED EMBODIMENTS

As is well known and illustrated, for example in the referenced U.S. Pat. No. 3,130,410, the field strength $e_T$ of an "n" element array antenna can be represented by the following equation:

$$e_T = e^{jN_1\psi} + e^{jN_2\psi} + \ldots + e^{jN_i\psi} + \ldots + e^{jN_n\psi} \quad (1)$$

where $N_i$ is proportional to the ith or space code position of the n elements, and $$\psi = \frac{2\pi}{\lambda} d \sin\theta,$$

and where d is equal to the array length L divided by $N_n$, or $d = L/N_n$, and $\lambda$ is equal to the wavelength.

Now for each general term $e^{jN\psi} = Z_N$ of any particular element of the array, a second element can be added providing a term whose argument is 180° out of phase with the existing term for any specific value of space angle $\theta$. When this is achieved, a zero or substantially infinite null is provided at the value of $\theta$ in question.

Mathematically this can be expressed as, $$\arg Z'_N = \arg Z_N + \pi, \text{ or}$$

$$N'\psi = N\psi + \pi \quad (2)$$

Further since, $$\psi = \frac{2\pi}{\lambda} d \sin\theta$$

then

-continued $$N' = N + \frac{\lambda}{2d \sin \theta} \tag{3}$$

Making the following substitution $$\frac{1}{K} = \frac{\lambda}{d \sin \theta} \tag{4}$$

Yields $$N' = N + \frac{1}{2K} \tag{5}$$

Accordingly, equation (5) specifies the required element positions which will result in a null or zero interference level at any desired value of space angle $\theta$ or K.

The values for N' resulting from the repeated application of equation (5) establishes the explicit element spacings required for the n antenna elements. The physical element positions are obtained by multiplying the relative code positions N by d.

The foregoing equations are conveniently normalized by letting K equal unity at the first zero in the antenna pattern. That is, K=1 when $\theta=\theta_o$ and is the first zero of the antenna pattern.

From equation (4) we have $$d=\lambda/\sin\theta_o \tag{6}$$

Hence $$K=\sin\theta/\sin\theta_o \tag{7}$$

And $$\psi=2\pi K \tag{8}$$

Forming a design zero at $K=K_1$ results in $$e_t = 1 + e^{j\frac{\pi k}{K_1}} \tag{9}$$

Forming a second design zero at $K=K_2$ yields $$e_t = 1 + e^{j\frac{\pi K}{K1}} + e^{j\frac{\pi K}{K2}} + e^{j\left(\frac{\pi K}{K1} + \frac{\pi K}{K2}\right)} \tag{10}$$

which factors into $$e_t = \left(1 + e^{j\frac{\pi K}{K1}}\right)\left(1 + e^{j\frac{\pi K}{K2}}\right) \tag{11}$$

Or in general for N forced zeros $$e_t = \left(1 + e^{j\frac{\pi K}{K2}}\right)\left(1 + e^{j\frac{\pi K}{K2}}\right)\ldots\left(1 + e^{j\frac{\pi K}{Kn}}\right) \tag{12}$$

The normalized magnitude for $e_t$ may be written more compactly as $$|e_t| = \prod_{i=1}^{n} \cos\frac{\pi K}{2K_i} \tag{13}$$

Equation (13) identifies the antenna pattern which results from forcing zeros at design K's of $K_1, K_2 \ldots K_n$ and demonstrates that zero will occur at all odd integers of each design K. Also, since we have a resultant pattern given by the product of cosine terms, the design progression is nonperturbating. That is, original design zeros are retained as new ones are formed with additional elements which enables independent tracking of separate interference sources.

Accordingly, the design equation, namely equation (5), is utilized in the subject invention to adaptively locate and independently track multiple interference sources, some or all of which may be mobile. As the interference arrival angle $\theta$ (or equivalently K) varies, the required element positions given by the code positions N are readily calculated and varied by one or more tracking loops, to be described, to facilitate tracking the interference with a substantially infinite null while simultaneously retaining the desired signal at its peak received value.

Referring now to FIG. 1, there is disclosed an embodiment of the invention in its simplest form and comprised of a simple two element array including antenna elements 1 and 2 whose mutual spacing is capable of being varied from a normal space coded position N to the spacing $N'=N+\frac{1}{2}K$ which is the spacing required to provide a null and thereby cancel a signal, for example an interference signal, arriving at a space angle $\theta$.

This variable spacing between elements 1 and 2 is provided by a servo motor 10 coupled, for example, to element 2 by a mechanical linkage which is shown schematically by reference numeral 12. The motor 10 comprises one component of a control loop which includes not only the antenna elements 1 and 2, but also a portion of a communications receiver 14 coupled to the antenna elements by a summing network 15. Additionally, the loop includes a null seeking detector circuit 16, the output of which is fed to the servo motor 10 by means of a loop filter network 18. The receiver 14 in its simplest form is shown comprised of an RF mixer 20 coupled to the output of the summing network 15 and a local oscillator, not shown, an IF amplifier 22, and a demodulator 24 which is adapted to provide an output consisting of the desired signal. An undesired interference signal which is received along with the desired signal is coupled as an IF signal to an interference signal detector 26 which may be, for example, implemented by means of a square law detector coupled to the output of the IF amplifier 22. The output of the interference signal detector 26 is coupled to a null decision circuit 28 in the null signal detector 16 which operates to slew the position of antenna element number 2 to a code space position N' by operation of the servo motor 10. Thus once an interference source has been detected in the detector circuit 26, a scanning operation is effected over the angular surface defining the angle $\theta$ until it is coincident with the direction of the interference as evidenced by the output of the null decision circuit 28.

Referring now to FIG. 2, disclosed thereat is a four element array comprised of the elements 1, 2, 3 and 4. Elements 3 and 4 are coupled to and are adapted to be moved together by the same amount ($\frac{1}{2}K_1$) by means of a first servo motor 30 while elements 2 and 4 are adapted to be moved simultaneously by the same amount ($\frac{1}{2}K_2$) by means of a second servo motor 32. Thus while elements 2 and 3 are only moved by the servo motors 32 and 30, respectively, the fourth element, namely element number 4, is adapted to be moved by both servo motors. As in the embodiment shown in FIG. 1, the four antenna elements feed into a common summing network 15 which is coupled to the mixer 20 of the receiver 14. Any interference signals appearing in the IF signal output of the IF amplifier 22 is coupled to the null seeking detector 16 which also includes an interference signal detector 26 and a null decision circuit 28. The output of the null decision circuit 28, however, is now fed to two separate loop filters 34 and 36 which have their outputs respectively coupled to control the servo motors 30 and 32.

The operation of the array shown in FIG. 2 can best be illustrated by reference to FIG. 3 wherein three of the four elements, namely elements 2, 3 and 4, are adapted to be moved relative to element number 1. Diagrammatically, the movable elements are shown to be moved forward or to the right of element number 1; however, in actuality, the elements 2, 3 and 4 would be shifted laterally or mutually parallel to the axis of the array. Accordingly, when a first interference signal is detected, the null decision circuit 28 causes the servo motor 30 to move elements 3 and 4 until a minimum output of the null decision circuit 28 occurs at $N'_1 = N_1 + \frac{1}{2}K_1$, at which point or code position signals from an interference source and arriving at a certain space angle $\theta$ is cancelled. In the event a second source of interference is present, then the null decision circuit 28 will cause servo motor 32 to move elements 2 and 4 to a spacing $N'_2 = N_2 + \frac{1}{2}K_2$ whereupon the signals received from the second source is simultaneously cancelled and a second null is established in the null signal detector 16.

The number of elements in an array according to the subject invention is an integer power of the base 2, so that, for example, while the embodiments shown in FIGS. 1 and 2 consist of 2 and 4 element arrays, respectively, the next higher order array would be an 8 element array, which is schematically shown in FIG. 4. The elements in such an array could be moved or space coded to cancel up to three separate interference signals. As shown in FIG. 4, for a first interfering signal, elements 5, 6, 7 and 8 would be moved a spacing $\frac{1}{2}K_1$ relative to elements 1, 2, 3 and 4 to provide a first space coded separation of $N'_1$. For a second interfering source, one half of the first moved elements, for example, elements 8 and 7, would be moved along with elements 3 and 4 while elements 1, 2, 5 and 6 remain stationary. Accordingly, elements 3, 4, 7 and 8 are moved by an incremental spacing $\frac{1}{2}K_2$ to provide a second code spacing $N'_2$ relative to elements 1 and 2 taken as a set and elements 5 and 6 taken as a second set. For a third interfering source, elements 2, 4, 6 and 8 would be moved $\frac{1}{2}K_3$ relative to elements 1, 3, 5 and 7 to establish a third code spacing $N'_3$. It can readily be seen that three separate tracking loops would be required to effectively position the elements 2 through 8 while keeping element number 1 permanently stationary.

The next larger array would comprise a 16 element array which could effectively be utilized to track and cancel up to four separate interference sources. This assumes, however, that four separate tracking loops would be utilized. In general, an $n = 2^M$ element array would be required to independently cancel M interference signals.

Whereas the embodiments of the invention considered thus far comprise electro-mechanical servo system configurations for tracking and nulling undesired signals received at a multi-element array, the embodiment shown in FIG. 5 is intended to illustrate that when desirable, a multi-element array comprising, for example, $n \geqq 2^M$ elements can be connected to switching means, for example, a switch matrix 38 so that the space coding between the n elements can be accomplished electronically rather than physically being moved and thus provide the scanning and slewing functions previously obtained with servo motors. Further, as shown in FIG. 5, the switching matrix 38 connected to the n antenna elements is controlled by a control processor 40 which responds to the respective outputs from a plurality of null seeking detector circuits $42_1$, $42_2$ . . . $42_m$ which are applied through respective loop filters $44_1$, $44_2$ . . . $44_m$.

Having thus shown and described what is at present considered to be the preferred embodiments of the subject invention, it should be noted that the foregoing detailed description has been made by way of illustration and not limitation. Accordingly, all modifications, alterations and changes coming within the spirit and scope of the invention as defined in the appended claims are herein meant to be included.

I claim:

1. An adaptive array antenna for cancelling undesired signals received thereby, comprising:
   - a plurality of antenna elements;
   - means for varying the space coded positions of said plurality of antenna elements in response to a control signal to provide a 180° phase difference between one half of the number of said plurality of antenna elements with respect to the other half of the number of said antenna elements for an undesired signal arriving at a certain space angle relative to an axis of said antenna;
   - receiver means coupled to said antenna elements and including means for detecting and providing an output signal of said undesired signal; and
   - means responsive to the amplitude of said undesired output signal for generating said control signal whereby said varying means varies said spacing between said halves of antenna elements until a null of said output signal occurs and said undesired signal is cancelled.

2. The array antenna as defined by claim 1 wherein said receiver means and said means for generating said control signal are coupled in a closed loop control circuit between said antenna elements and said means for varying the space code positions thereof.

3. The antenna as defined by claim 2 wherein said means for generating a control signal additionally includes null signal detector means.

4. The array antenna as defined by claim 3 wherein said undesired signal comprises an interference signal from an external source and wherein said antenna elements have a first coded space position relative to said other half of said antenna elements in absence of said interference signal and a second coded space position when said predetermined interference signal is present, said spacing between said first and second code spacing being an incremental spacing equal to $\frac{1}{2}K$ where K is related to a space angle $\theta$ by the expression $d/\lambda \sin \theta$, where d is equal to the length of the array of said plurality of antenna elements divided by the space code positions of said one and other halves of said plurality of antenna elements in absence of said interference signal and $\lambda$ is equal to wavelength.

5. The array antenna as defined by claim 4 wherein said plurality of antenna elements comprises n elements where n is an integer power of the base 2.

6. The array antenna as defined by claim 5 wherein said one and said other half of the number of said antenna elements comprise first and second sub-arrays each comprised of n/2 elements.

7. The array antenna as defined by claim 6 wherein said means for varying the space code positions comprises motor means coupled to said n/2 elements of said first sub-array for moving said n/2 elements in unison relative to said n/2 elements of said second sub-array.

8. The array antenna as defined by claim 7 and wherein said closed loop additionally includes signal filter coupled between said null signal detector means and said motor means.

9. The array antenna as defined by claim 6 wherein said means for varying the space coded positions comprises means for electronically varying the space coding of said n/2 elements of said first sub-array relative to said n/2 elements of said second sub-array.

10. The array antenna as defined by claim 9 wherein said means for electronically varying the space coding of said first and second sub-arrays comprises a switch matrix coupled to said n antenna elements and control means responsive to said control signal for selectively activating said switch matrix.

11. The array antenna as defined by claim 10 and additionally including signal filter means coupled between said control signal generating means and said control means.

12. The array antenna as defined by claim 11 wherein said control means comprises a control signal processor.

13. An adaptive array antenna for cancelling a plurality of interference signals received thereby, comprising:

a plurality of antenna elements;

means for varying the space coded positions of said plurality of antenna elements in sets of antenna elements equal in number to the number of said plurality of interference signals received, said varying means being responsive to a control signal for each said interference signal to provide a respective 180° phase difference between one half the number of antenna elements in each set relative to the other half of elements in said set for each space angle of arrival for the plurality of interference signals received;

receiver means coupled to said antenna elements and including means for detecting said plurality of interference signals and providing a composite output signal of the detected plurality of interference signals; and means responsive to the amplitude of said output signal for generating a respective control signal for each interference signal detected, said respective control signal being applied to said varying means to vary the space coded positions of said sets of said antenna elements in a predetermined sequence until a null for each interference signal occurs as indicated by the amplitude of said output signal to provide said respective 180° phase differences whereby said interference signals are cancelled.

14. The array antenna as defined by claim 13 wherein said receiver means and said means for generating a control signal comprise a portion of a plurality of closed loop control circuits, one for each interference signal, coupled between said antenna elements and said means for varying the space code positions of said antenna elements.

15. The array antenna as defined by claim 14 wherein each set of antenna elements have a first coded space position relative to said other half of said antenna elements in said set in absence of said interference signal and a second coded space position when said predetermined interference signal is present, said spacing between said first and second code spacing being an incremental spacing equal to $\frac{1}{2}K$ where K is related to a space angle $\theta$, for a respective interference signal, by the expression $d/\lambda \sin \theta$ where d is equal to the length of the array of said set of a plurality of antenna elements divided by the space code positions of said one and other halves of said set of antenna elements in absence of said interference signal and $\lambda$ is equal to wavelength.

16. The array antenna as defined by claim 15 wherein said plurality of antenna elements comprises n elements where n is an integer power of the base 2.

17. The array antenna as defined by claim 16 wherein said n elements repetitively sub-divide in half for each interference signal in sequence into $2^M$ sets of progressively diminishing number of elements by said space code position varying means, where M is equal to the number of interference signals.

18. The array antenna as defined by claim 17 wherein said means for generating a control signal additionally includes null signal detector means in said plurality of closed loop control circuits.

19. The array antenna as defined by claim 18 wherein said means for varying the space code positions of said antenna elements comprises plural motor means respectively coupled to said null signal detector means and being selectively coupled to said sets of antenna elements to progressively move one half the elements of each set in unison relative to the other half of the elements in said set.

20. The array antenna as defined by claim 19 wherein each of said closed loop control circuits additionally include respective signal filter means coupled between said null signal detector means and said plural motor means.

21. The array antenna as defined by claim 20 wherein said null signal detector means comprises a respective null signal detector in each closed loop control circuit.

22. The array antenna as defined by claim 18 wherein said means for varying the space coded positions comprises means for electronically varying the space coding of said sets of antenna elements.

23. The array antenna as defined by claim 22 wherein said means for electronically varying the space coding comprises a switch matrix coupled to said plurality of antenna elements and control means therefor responsive to respective control signals generated by said plurality of closed loop control circuits for selectively activating said switch matrix.

24. The array antenna as defined by claim 23 and additionally including respective signal filter means in said plurality of closed loop control circuits coupled between said control means and said null signal detector means.

25. The array antenna as defined by claim 11 wherein said control means comprises a signal processor.

* * * * *